Aug. 24, 1948.  S. P. TUREK  2,447,992

EXTENSIBLE SUPPORTING POST FOR CLOTHESLINES

Filed March 8, 1946

Inventor:
Stanley P. Turek
by Banning & Banning
Attorneys

Patented Aug. 24, 1948

2,447,992

UNITED STATES PATENT OFFICE 2,447,992

EXTENSIBLE SUPPORTING POST FOR CLOTHESLINES

Stanley P. Turek, La Grange, Ill., assignor to Modern-Aire Mfg. Corporation, Chicago, Ill., a corporation of Illinois Application March 8, 1946, Serial No. 652,894

4 Claims. (Cl. 248—353)

My invention relates to an extensible supporting post comprising two tubular elements, one slidingly fitted within the other. Such a post is well suited for supporting clotheslines in various out of doors places. The length of the post should be variable to meet many diverse conditions, consequently the feature of extensibility is important.

A clothes pole of this character, when fully extended, may be perhaps ten feet in length. Unless it can be shortened for convenient storage in doors, it will not be possible to place it away where it will be proof against theft and possibly damage as well. It is accordingly desirable that the post be easily and readily extensible or contractible, so as to be made either long or short, according to the wishes of the user.

The particular feature with which my invention is here concerned relates to a friction lock which is effective to support one of the tubular elements when extended outwardly relative to the other. Unless the lock be secure, the post may collapse thereby rendering it unfit for its intended service. According to my invention, the lock is in the form of a plate which, when assembled in place, will remain permanently so. It is normally rocked by gravity to a down position where it presents certain acutely-angled edges in engagement with the surface of the raised tubular element. Raising of this element to different heights, according as required by conditions, may be performed without touching the lock which automatically releases its grip upon the tubular element when any up movement takes place. The moment this movement stops, the lock takes hold again without any attention on the part of the user. It operates to permit extension in one direction only for any desired distance within the movement range of the raised element. To release the lock, it is necessary only to apply thereto a light lifting force whereupon the raised tubular element is free to descend by gravity.

An extensible post having a lock with these characteristics can be produced at small expense, and the operation of the lock may be dependably relied upon when subjected to use under all the various conditions encountered in service. It readily adapts the post for lengthened outdoor use and for shortened in-door storage, all as will be hereinafter explained in detail.

An exemplification of this invention is set forth in the accompanying drawing wherein.

Figure 3:
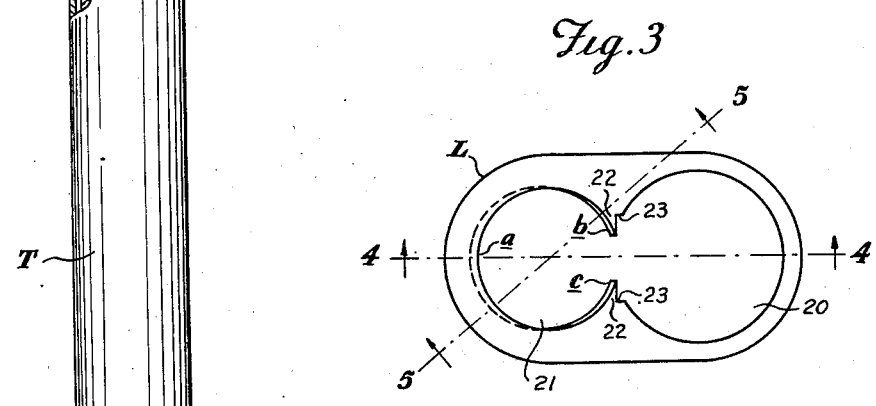
Fig. 3 is a top plan view of the plate which constitutes the present lock.
Figure 4:
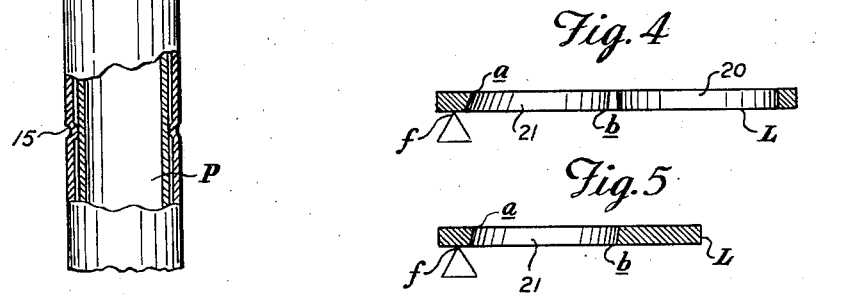
Figure 5:
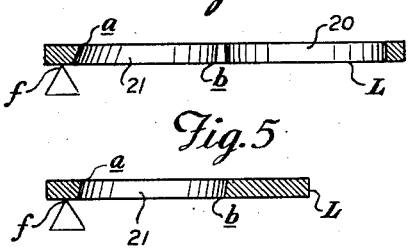

Figs. 4 and 5 are semi-diagrammatic views in section through the plate, taken, respectively, on lines 4—4 and 5—5 of Fig. 3.

The present extensible post comprises two telescoping tubular parts, the outer one of which I will call the tube T, the inner part being referred to as the pipe P. These two terms have been arbitrarily chosen for purposes of convenient differentiation. Secured to the bottom of the tube is a foot piece 12 adapted to rest on the floor or on the ground when the post is stood up either in or out of doors. The length of the pipe is slightly longer than that of the tube so that a couple of inches or so of the former will always protrude upwardly beyond the top end of the latter. The fit between the pipe and the tube is sufficiently loose to permit free sliding movement of one relative to the other, even though neither be made with more than the usual accuracy which characterizes such items when produced for the commercial market. If desired, an inward crimp 13 may be formed near the top of the tube to serve as a bearing for the pipe therewithin. Extending upwardly at the top is a pair of spring fingers 14 affording a clip for receiving and holding a clothesline (not shown) that is to be supported.

At a point perhaps 8" from its top the tube is formed with an inward circumferential crimp 15 which provides a stop for engaging with an outward flare 16 at the bottom of the pipe. When the pipe is upwardly extended within the tube, the flared lower end of the pipe will eventually engage the crimp to arrest its further upward movement at this point where a sufficient length of the tube still surrounds the pipe to afford an adequate lateral support therefor. The problem which my invention successfully meets is the provision of a dependable friction lock L which will support the pipe at any elevation whatsoever within the range of its extensible movements, whereby to adapt the post to be used under diverse conditions out of doors; and also a lock which may be easily released to permit the pipe to descend by gravity into the tube whereby in its shortened condition it may conveniently be brought indoors for storage in a protected place.

As shown, the present lock comprises a plate having a thickness of perhaps ⅛". The plate which is somewhat elongated is shown as having each of its opposite ends rounded. In one end region of the plate is formed a through opening 20 which is curved through perhaps 270°, the diameter of this incomplete circular opening being very slightly greater than the outside diameter of the tube T. A second and smaller through opening 21 is formed in the opposite end region of the lock plate, the periphery of this opening being extended through perhaps 270°. The diameter of this latter opening is very slightly larger than the outside diameter of the pipe P. Between the two openings there is a communicating gap defined by a neck 22 which is arcuate on both sides. On the neck side which faces the larger opening 20, I have provided a pair of notches 23 defining angular seats the purpose of which will presently appear. The peripheral edges of the two openings 20 and 21, as well as the double-faced neck therebetween, are substantially normal to the upper and lower surfaces of the lock plate except only in the smaller opening 21 at three spaced points, viz. in the region topped by the acutely-angled edge $a$ opposite the neck and in the opposite neck edges facing this same opening where acutely-angled edges $b$ and $c$ are formed. Adjacent each of these points the edges of the opening are slanted in conformity with the walls of a cylinder whose axis is inclined toward the axis of a cylinder defined by the curved edge of the large opening 20.

Near its top the tube wall is cut away to provide an arcuate transverse slot $s$ extending circumferentially through something more than 180° perhaps 270° or so. The upper edge 30 of this slot may extend transversely of the tube axis; its lower edge 31 is slanted upwardly from both ends to provide a fulcrum point $f$ at the high center; and the edges of the web 32 constituting the tube wall at the opposite end of the slot extend in a generally vertical direction. When the lock plate L is assembled operatively in place, it will lie in the plane of the slot $s$; its smaller opening 21 will closely surround the pipe P which is exposed through the slot $s$ to make possible this contact of one with the other; and the sharply-angled edge of this opening, at the point $a$ which coincides with its maximum extension inwardly thereof, will engage the pipe wall to establish a friction lock therewith at any and all points lengthwise of its surface according to its adjusted position relative to the tube T. The lock plate thus becomes a lever of the third class, the pipe being the effort tending to rock the plate to its down position.

Figure 1:
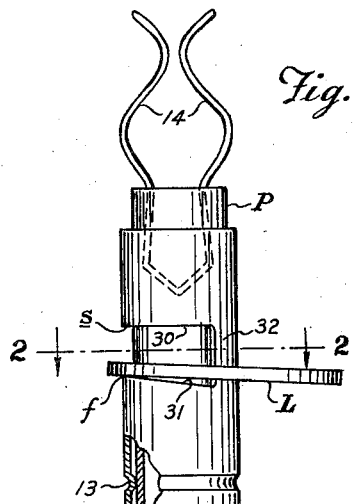
Figure 1 is a side elevation of an extensible post having my improved lock fitted thereto, the lower end of the post being shown in section.
Figure 2:
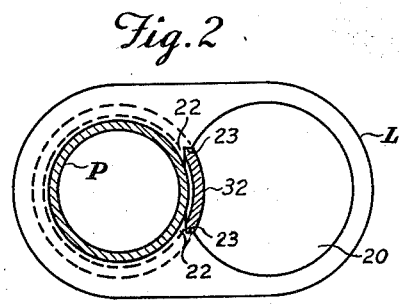
Fig. 2 is a transverse section, taken on line 2—2 of Fig. 1.

In assembling the lock plate in place, the upper tube end is first threaded through the larger opening 20 to the point of positioning its slot $s$ opposite the plate; the lock plate is then shifted endwise until the web edges 32 are engaged within the notches 23 in which position (see Fig. 2) the plate opening 21 is coaxially aligned with the pipe; the pipe is then moved upwardly to advance its upper end through the smaller opening 21 of the lock plate; and the foot and clip fittings are then applied and secured in place whereby to lock the pipe against endwise removal from the tube. When the lock plate is being assembled in place, care should be taken to have uppermost the face thereof which is proximate to the acutely-angled edge $a$.

In use, the lock plate will normally be supported by the tube at one point only, viz., the high point $f$ of the slot lower edge 31. This point is opposite the web 32. The lock plate is extended away from this point of support and outwardly beyond the web side of the tube. Its free end tends always by gravity to swing downwardly. In so doing the plate drops out of a plane which is more or less normal to the axis of the post so as to engage with the pipe at the acutely-angled grip points $a$, $b$, and $c$, each of which makes a short line contact with the pipe. The downward slant of the lower edge 31 of the slot toward the web side of the tube will afford sufficient clearance for this free rocking movement of the lock plate in response to gravity force. The pipe will accordingly be gripped frictionally by the edge points $a$, $b$, and $c$ so as to be supported by the lock plate at any elevation within its range of vertical movements relative to the tube. The lateral extension of the lock plate outwardly of the web side of the tube assures an unbalance for the plate sufficient for the plate to remain always in a down position, regardless of the inclination of the post when in use. To shorten the post the lock plate is lifted at its free end, whereupon the frictional engagement of its gripping points with the pipe is terminated, and the pipe is free to descend by gravity.

I claim:

1. An extensible post for vertical support comprising a tube, a pipe slidingly fitted within the tube, the tube being formed intermediately of its ends with a transverse slot extending arcuately through more than 180° to expose the pipe therewithin at one point, and a friction lock in the general form of an elongated plate having an opening through which the interfitted pipe and tube may extend when the plate is opposite the slot, the plate being extended laterally of the tube outwardly away from the slot and there being a high point medially in the lower edge of the slot providing a fulcrum whereon the plate at a point adjacent one of its ends is free to rock through a limited distance, and the plate being formed to the inside of its opening with an acute-angled gripping point adjacent the fulcrum whereby to engage the pipe with a high degree of friction when the plate is in its normal down position.

2. An extensible post for vertical support comprising a tube, a pipe slidingly fitted within the tube, the tube being formed intermediately of its ends with a transverse slot extending arcuately through more than 180° to expose the pipe therewithin at one point, and a friction lock in the general form of an elongated plate having an opening through which the interfitted pipe and tube may extend when the plate is opposite the slot, the plate being extended laterally of the tube outwardly away from the slot and there being a high point medially in the lower edge of the slot providing a fulcrum whereon the plate at a point close to one of its ends is free to rock through a limited distance, and the plate being formed to the inside of its opening with an acute-angled gripping point adjacent the fulcrum whereby to engage the pipe with a high degree of friction when the plate is in its normal down position, the plate being formed also opposite the gripping point with means engaging the tube to prevent lateral swinging movement of the plate.

3. An extensible post for vertical support comprising a tube, a pipe slidingly fitted within the tube, the tube being formed intermediately of its ends with a transverse slot extended arcuately through more than 180° to expose the pipe therewithin at one point, the tube wall between the slot ends extending continuously in the form of a web, and a friction lock in the general form of an elongated plate having an opening through which the pipe and tube may extend when the plate is opposite the slot, the plate being extended laterally of the tube outwardly upon the web side thereof, there being a high point medially in the lower edge of the slot providing a fulcrum whereon the plate at a point close to one of its ends is free to rock through a limited distance, and the plate being formed with a pair of notches engagable with the web to center the plate opening coaxially with the pipe, and the plate being formed to the inside of its opening with an acute-angled gripping point adjacent its fulcrum whereby to engage the post with a high degree of friction when the plate is in its normal down position.

4. An extensible post for vertical support comprising a tube, a pipe slidingly fitted within the tube, the tube being formed intermediately of its ends with a transverse slot extending arcuately through more than 180° to expose the pipe therewithin at one point, and an elongated friction lock plate having an opening in the form of two intersecting circles of unequal size, the larger being adapted to closely receive the tube and the smaller to closely receive the pipe, the gap between the circles being partly closed by an arcuate neck, the tube when fitted within the larger opening of the plate permitting the plate to shift endwise to a position where the axis of its smaller opening is in coincidence with the axis of the tube only when the plate is positioned opposite the arcuate slot and the post is shifted to an endwise position removed therefrom, the plate being locked against removal from the tube when the post is advanced endwise to present itself opposite the slot and within the smaller opening, a fulcrum adjacent one end of the plate whereon the plate is gravity operated to rock to a down position, and means on the plate engagable with the post when the plate is in its normal down position for frictionally locking the post against sliding movement in one direction within the tube.

STANLEY P. TUREK.

REFERENCES CITED

The following references are of record in the file of this patent:

UNITED STATES PATENTS

| Number | Name | Date |
| --- | --- | --- |
| 1,731,382 | Knoth | Oct. 15, 1929 |
| 2,051,969 | Shastock | Aug. 25, 1936 |
| 2,168,962 | Schoenlaub | Aug. 8, 1939 |